No. 649,932.  
J. H. HODGES.  
TRUCK.  
(Application filed Mar. 13, 1900.)  
Patented May 22, 1900.

(No Model.)

Witnesses  
F. E. Alden.

John H. Hodges, Inventor.  
By his Attorneys,

UNITED STATES PATENT OFFICE.

JOHN H. HODGES, OF ADLER, ARKANSAS.

TRUCK.

SPECIFICATION forming part of Letters Patent No. 649,932, dated May 22, 1900.

Application filed March 13, 1900. Serial No. 8,495. (No model.)

*To all whom it may concern:*

Be it known that I, JOHN H. HODGES, a citizen of the United States, residing at Adler, in the county of Izard and State of Arkansas, have invented a new and useful Truck, of which the following is a specification.

This invention relates to trucks for handling freight—such as boxes, barrels, and the like—and has for its object to provide an improved truck of this character which is provided with means for securely holding the freight upon the truck and at the same time permitting of the ready removal thereof. It is furthermore designed to facilitate the application and removal of the holding device with respect to the freight, so that the operator has such device under complete control without moving from his position at the handles of the truck.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
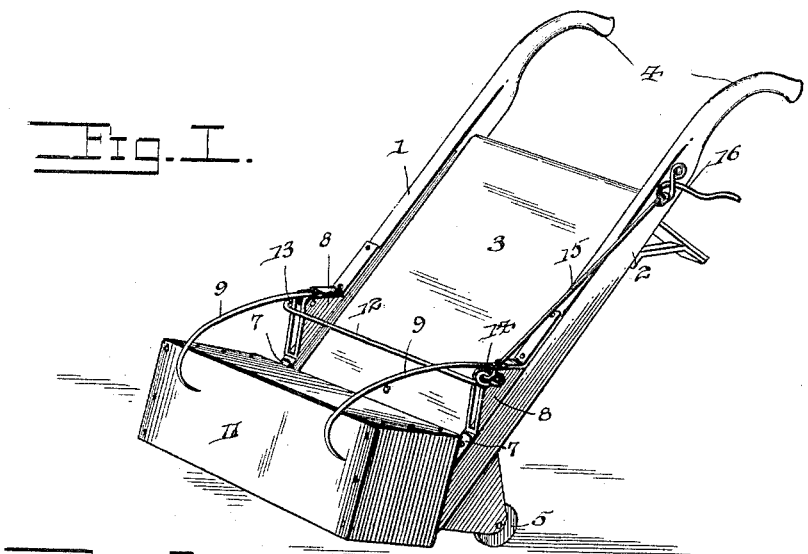
Figure 2:
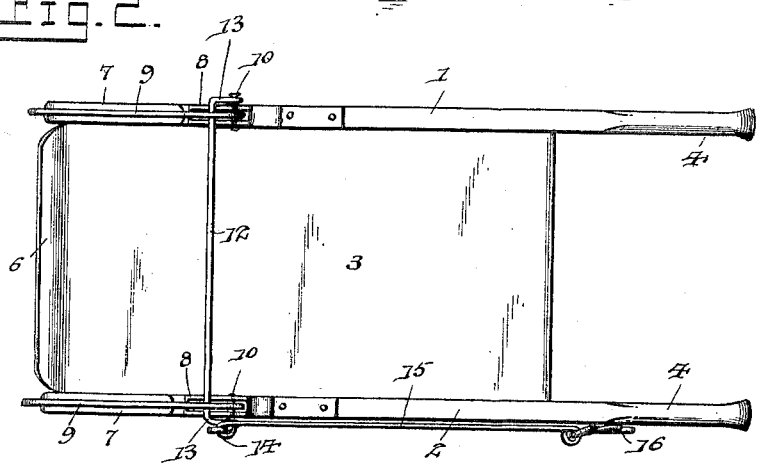
Figures 3, 4:
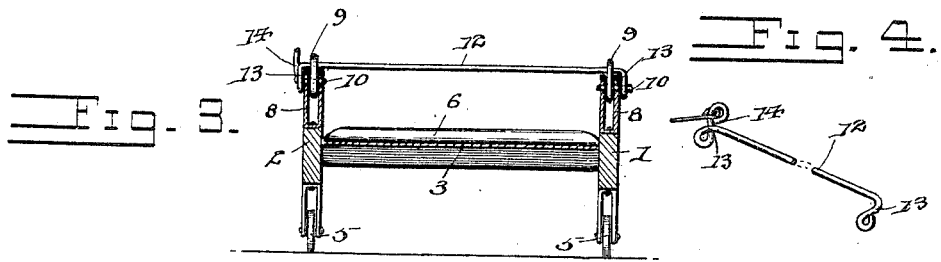

In the drawings, Figure 1 is a perspective of a truck constructed in accordance with the present invention. Fig. 2 is a top plan view thereof. Fig. 3 is a transverse sectional view taken on the line *x x* of Fig. 2. Fig. 4 is a detail perspective view of the rock-shaft for actuating the holding devices.

Corresponding parts in the several figures of the drawings are designated by like characters of reference.

Referring to the accompanying drawings, 1 and 2 designate, respectively, the opposite side bars of the frame of the truck, which are connected by an intermediate platform 3. The rear ends of the side bars are formed into the usual handles 4, and at the forward ends of the side bars there are provided the rollers or wheels 5, which may be mounted in any preferred manner.

The platform 3 is preferably formed of sheet metal, having its front end turned or bowed slightly upward, so as to form a shoe 6 for engagement beneath the article of freight to be placed upon the truck. The forward end of each side bar is provided with a protecting metallic plate 7 to protect the bar against wear.

Secured to the upper side of each side bar and at a suitable distance inwardly from the front end thereof is a longitudinally-slotted bearing-bracket 8, and the opposite brackets are alined transversely of the truck. A hook or claw 9 has its rear end located within the respective bearing-brackets and connected thereto by means of a suitable pivot-pin 10. The forward free ends of these claws or hooks are designed to extend slightly beyond the forward ends of the side bars, as best indicated in Fig. 2 of the drawings, so as to engage with a box or the like 11, as shown in Fig. 1. To elevate these hooks, there is provided a transverse rock-bar 12, the opposite ends of which extend laterally across the respective bearing-brackets and are extended rearwardly, so as to form crank-arms 13, which are located upon the outer sides of the brackets and also mounted upon the same pins which pivotally connect the hooks to the brackets. One end of the rock-bar is provided with a bell-crank 14, with which is connected a connecting-rod 15, that extends rearwardly at the outer side of the adjacent side bar and has its rear end connected to an operating bell-crank 16, mounted upon the outer side of the frame-bar and adjacent to the handle portion thereof, so as to be in convenient reach of the operator without requiring him to move from his position at the handles. It will of course be understood that the rock-bar 12 is located beneath the claws or hooks, so that when the operating bell-crank is operated the rock-bar is rocked upwardly against the hooks to elevate the latter for application to the upper edge of a box or whatever it may be desired to place upon the truck.

In the operation of the device the truck is run up to the box or barrel and the shoe 6 engaged beneath the bottom thereof in the usual manner, the hooks having been elevated so as to engage the upper side of the box, after which the handles of the truck are depressed, so as to elevate the forward end of the truck and the box, the hooks or claws holding the box to the truck in an effective manner. When the box is to be removed from the truck, the bell-crank 16 is operated to raise the rock-bar 12 into engagement with the under sides of the hooks or claws, and thereby to disengage the latter from the box in order that the same may be free to be taken from the truck.

It will of course be understood that the bearing-brackets 8 may be located nearer the handle ends of the side bars of the truck and the hooks or claws made longer to accommodate the truck to very large boxes.

What I claim is—

1. In a truck, the combination with a wheeled frame, of a pair of opposite hooks or claws pivoted to said frame, a rock-bar located below and for engagement with the hooks, and means for operating the rock-bar.

2. In a truck, the combination with a wheeled frame, of a pair of opposite hooks or claws, pivot-pins to pivotally connect the hooks or claws to the frame, a rock-bar, having crank-arms at opposite ends thereof, and mounted upon the respective pivot-pins of the hooks or claws, and means for operating the rock-bar.

3. In a truck, the combination with a wheeled frame, of opposite bearing-brackets carried by the frame, hooks or claws mounted upon the respective brackets, pivot-pins for the hooks or claws, a transverse rock-bar located beneath the hooks or claws and for engagement therewith, crank-arms at opposite ends of the rock-bar and mounted upon the pivot-pins of the respective hooks or claws, a bell-crank at one end of the rock-bar, an operating bell-crank mounted upon the frame adjacent to the rear end thereof, and an operating connection between the two bell-cranks.

In testimony that I claim the foregoing as my own I have hereto affixed my signature in the presence of two witnesses.

JOHN H. HODGES.

Witnesses:
JNO. W. BRYANT,
ELI H. MUNCY.